June 4, 1963  G. W. CORSAN  3,092,349
SPOOLS FOR BUSINESS MACHINES
Filed Aug. 9, 1960  2 Sheets-Sheet 1

INVENTOR
GEORGE WILLIAM CORSAN

BY Silverman, Mullin & Cass

ATTORNEYS

June 4, 1963   G. W. CORSAN   3,092,349
SPOOLS FOR BUSINESS MACHINES
Filed Aug. 9, 1960   2 Sheets-Sheet 2
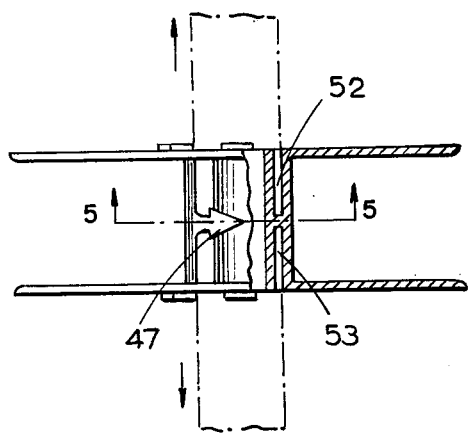
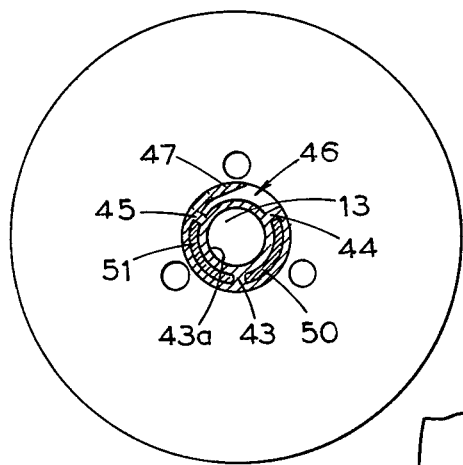
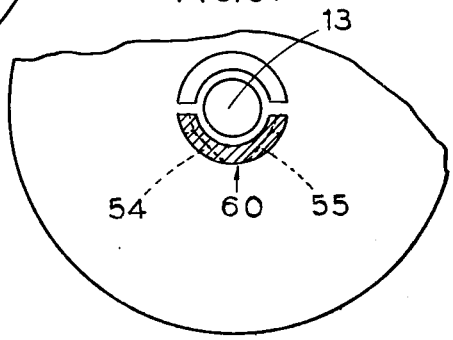
INVENTOR
GEORGE WILLIAM CORSAN
BY
ATTORNEYS

United States Patent Office 3,092,349
Patented June 4, 1963

3,092,349
SPOOLS FOR BUSINESS MACHINES
George William Corsan, Bexleyheath, England, assignor to Walter Grafton & Son Limited, London, England
Filed Aug. 9, 1960, Ser. No. 48,451
Claims priority, application Great Britain Aug. 11, 1959
5 Claims. (Cl. 242—74)

This invention relates to one-piece moulded or cast spools, and in particular to injection moulded spools for business machines such as typewriters.

In my copending application Serial No. 38,967 filed June 27, 1960, there was discussed the difficulties in the production of one-piece spools furnished with prongs and described a spool and a method of moulding in which there was employed a core withdrawable diametrically relatively to the spool.

It is an object of the present invention to overcome the same drawbacks as previously discussed and to permit the moulding of a one-piece spool with the prong forming part of the spool, but I have found that in the present invention the arrangement of cores as described hereinafter may be preferable for certain types of spool to that described in our aforementioned co-pending application.

According to the present invention, a one-piece injection moulded or cast spool, for e.g. a typewriter ribbon, has a hub consisting of a cylindrical inner wall and a cylindrical outer wall extending partly around said inner wall and having formed therein a window defining a circumferentially extending prong.

The ends of the hub may be formed with radially extending passages giving access to the window. The spool may be flangeless or may have one or two flanges through which the passages extend. The flange or flanges may have driving means associated therewith if desired, said driving means being constituted for example by raised lugs or by holes.

The window formed in the outer wall of the hub may define two circumferentially extending prongs confronting one another. Alternatively, there may be two windows formed in the outer wall, each window defining a circumferentially extending prong, and the prongs confronting one another.

Figure 1:
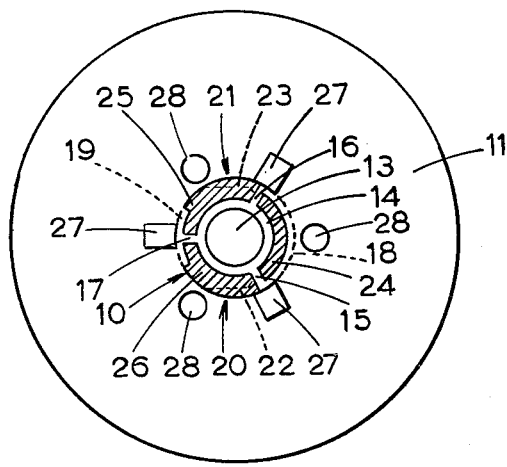
Figure 2:
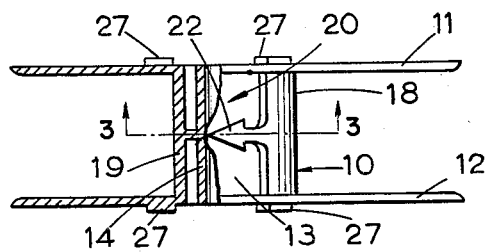
Figure 3:
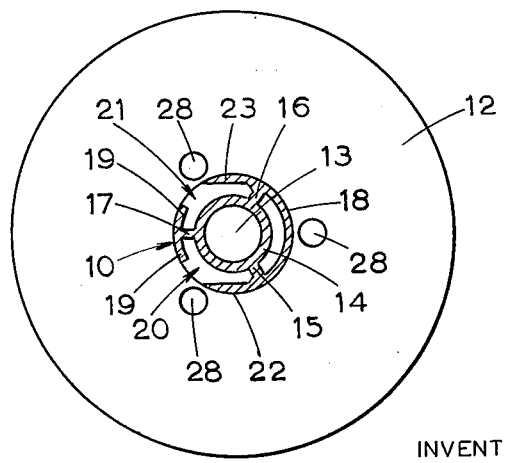

Embodiments of the invention will be described with reference to the accompanying drawings, in which:

FIGURE 1 is a front elevation view of a first embodiment of a spool having two prongs, showing some of the cores, FIGURE 2 is a side elevational view of the spool, partly sectioned, FIGURE 3 is a sectional elevational view of the spool on the line 3—3 of FIGURE 2, FIGURE 4 is a side elevational view, partly sectioned, of another embodiment of spool having one prong, and indicating the axial cores therefor, FIGURE 5 is a sectional elevational view of the spool on the line 5—5 FIGURE 4, FIGURE 6 is a fragmentary front elevational view of such a spool.

Referring to FIGURES 1 to 3, a spool has a hub 10 of generally cylindrical shape and circular disc-like flanges 11, 12 extending therefrom in the usual manner. The central hole 13 is cylindrical and is formed of any required diameter by means of an axially extending cylindrical core or by two such cores to be described hereinafter, arranged to extend coaxially into the aperture from each side and to be withdrawable axially, and it will be understood that the central aperture 13 is independent of the prong-forming means and may be of any shape or size as desired. It is to be further understood that this freedom of choice in determining the size and shape of the central aperture is of great importance in giving flexibility to the method, permitting the moulding of a wide range of one-piece spools.

The central hole 13 is bounded by an inner wall 14 which extends around said aperture unbroken. The wall 14 has three radially extending ribs 15, 16, 17, the two ribs 15 and 16 being united by an outer cylindrical wall portion 18 and the rib 17 having a small portion of an outer wall 19 extending therefrom on each side. There are therefore left between the ends of the wall portions 19 and the ribs 15 and 16, windows 20 and 21 indicated by arrows. Within the window 20 there is a prong 22 and within the window 21 there is a prong 23, said prongs extending circumferentially around the hub as will be seen in FIGURE 2.

Referring to FIGURE 1, the hatched portion 24 indicates a core member to be described in more detail hereinafter, while the hatched portions 25 and 26 also indicate core members which as will be described more fully are employed to form the prongs.

Raised lugs 27 moulded on the outside of the flanges 11, 12 of the spool serve as driving members, and in addition or alternatively, recesses 28 may be moulded to receive driving pins.

It will be seen that a spool of such moulded construction has the important features that freedom of choice for the central hole 13 is combined with a readily mouldable construction in which all walls are of approximately equal thickness, enabling moulding to take place without distortion, and there are two prongs integral with the hub and yet within its outer circumferential boundary.

Instead of having two windows each defining a prong, a spool may have a single window containing either one prong or two prongs. FIGURES 4 and 5 show one such spool, there being no essential difference between this spool and that illustrated in FIGURES 1 to 3. The central hole 13 is bounded by an unbroken wall 43a having three radially projecting ribs 43, 44, 45, between two of which, namely 44 and 45, there is a window 46 having a prong 47 therein. Two pairs of core members, indicated in FIGURE 5 at 50 and 51 serve to mould passages such as 52, 53 (see FIGURE 4) in the hub but without defining a window or forming a prong.

FIGURE 6 indicates an alternative construction of spool and cores in which a single window 60 such as the window 46 just described contains two prongs 54, 55 confronting one another.

The invention may be applied to flangeless spools, or spools having square flanges, or other varieties of spool normally employed.

What it is desired to be secured by Letters Patent is:

1. A one piece molded spool for a business machine, comprising, a hub, two parallel circular flanges spaced apart by said hub, said hub comprising an inner cylindrical wall extending between said flanges and having an axial length not exceeding the distance between the outer surfaces of said flanges, said inner cylindrical wall defining a bore adapted to receive a spool drive shaft, and an outer cylindrical wall coaxial with said inner cylindrical wall and spaced therefrom, but united therewith, by at least one web lying in a plane parallel with the planes with which said flanges lie, said outer cylindrical wall having at east one aperture extending over the whole of the axial length thereof, a ribbon-engaging prong formed integral with said outer wall and extending into said aperture around a part of the circumference of the hub and in a plane normal to the axis of the spool, parallel with, and midway between, the planes in which said flanges lie.

2. A structure as described in claim 1 having driving means for said spool, said driving means comprising upstanding lug formations formed on the external surface of one of said flanges.

3. A structure as described in claim 1, having driving means for said spool, said driving means comprising pin engaging recesses in an external surface of one of said flanges.

4. A structure as described in claim 1 in which a second ribbon-engaging prong is formed integral with that portion of said outer wall opposite the first ribbon-engaging prong, said second ribbon-engaging prong extending into said aperture around a part of the circumference of the hub and in a plane normal to the axis of the spool, said second prong extending toward said first prong.

5. A structure as described in claim 1 wherein said outer wall has a second aperture and a second ribbon-engaging prong as formed integral with said outer wall and extending into said second aperture around a part of the circumference of the hub and in a plane and normal to the axis of the spool, said second prong extending in a direction toward said first prong.

References Cited in the file of this patent

UNITED STATES PATENTS

| | | |
|---|---|---|
| 1,073,110 | Fairchild | Sept. 16, 1913 |
| 1,301,696 | Hess et al. | Apr. 22, 1919 |
| 1,509,441 | Niess-Waner | Sept. 23, 1924 |
| 2,193,158 | Bezanson | Mar. 12, 1940 |
| 2,232,461 | Kuckoff | Feb. 18, 1941 |
| 2,366,147 | May | Dec. 26, 1944 |
| 2,448,676 | MacMillin et al. | Sept. 7, 1948 |
| 2,457,336 | Wilson | Dec. 28, 1948 |
| 2,552,222 | Schulz et al. | May 8, 1951 |
| 2,615,643 | Barsam | Oct. 28, 1952 |
| 2,672,653 | Simpkins et al. | Mar. 23, 1954 |
| 2,825,450 | Lambert | Mar. 4, 1958 |
| 2,873,014 | Lambert | Feb. 10, 1959 |
| 2,881,894 | Regentrop et al. | Apr. 14, 1959 |
| 2,904,277 | Underwood | Sept. 15, 1959 |
| 2,956,309 | Herbst | Oct. 18, 1960 |

FOREIGN PATENTS

| | | |
|---|---|---|
| 975,627 | France | Oct. 17, 1950 |